UNITED STATES PATENT OFFICE.

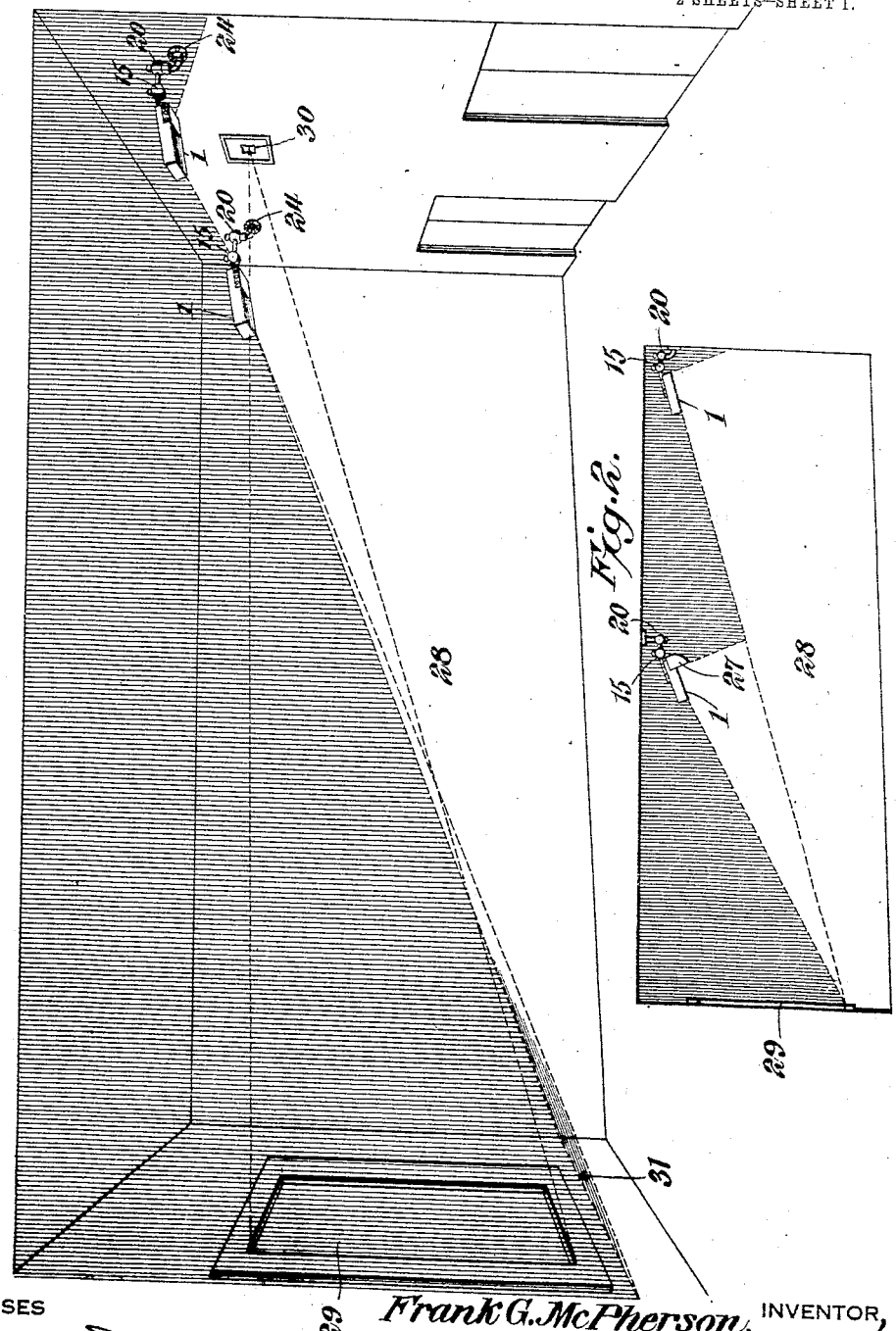

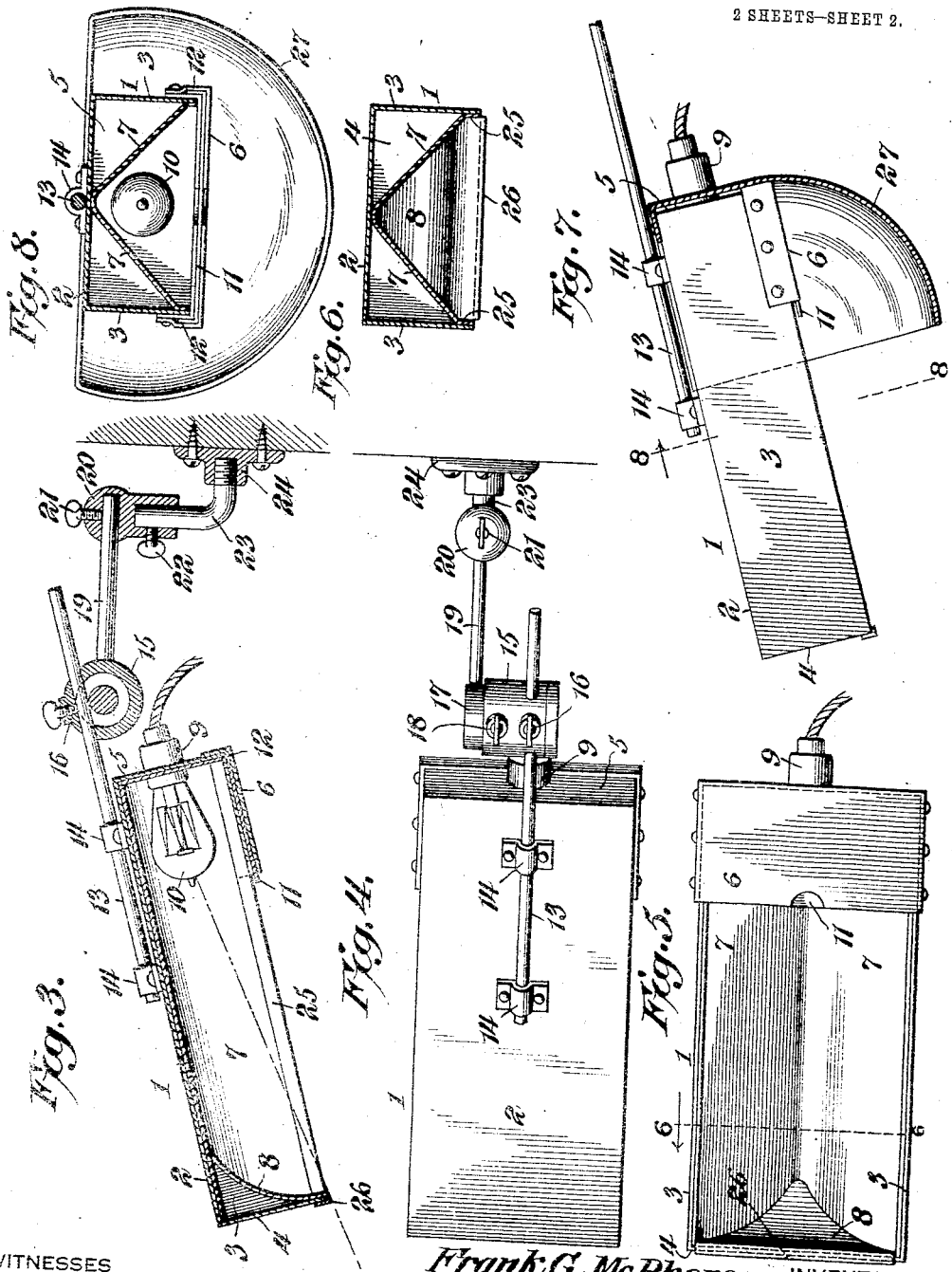

FRANK G. McPHERSON, OF BEAVER FALLS, PENNSYLVANIA, ASSIGNOR TO SHADO-LITE MANUFACTURING CO., INC., OF BEAVER FALLS, PENNSYLVANIA, A CORPORATION OF DELAWARE.

LIGHTING MEANS FOR MOTION-PICTURE AUDITORIUMS.

1,124,635.  Specification of Letters Patent.  Patented Jan. 12, 1915.

Application filed April 4, 1914. Serial No. 829,596.

*To all whom it may concern:*

Be it known that I, FRANK G. McPHERSON, a citizen of the United States, residing at Beaver Falls, in the county of Beaver and State of Pennsylvania, have invented a new and useful Lighting Means for Motion-Picture Auditoriums, of which the following is a specification.

This invention has reference to improvements in lighting means for motion picture auditoriums, and its object is to provide lighting means whereby that part of the auditorium occupied by the audience is well lighted while the screen upon which the pictures are exhibited is shielded from the light source, and the eyes of the audience are also shielded from the light source.

There is a continually increasing urgent demand for ample lighting of the auditoriums of motion picture theaters, but because of the interference of auditorium light with the effect of the picture thrown upon the screen difficulty has been experienced in obtaining the desirable lighting of the auditorium without at the same time interfering to a material extent with the exhibition of the pictures. The customary practice is to employ shielded side lights or indirect ceiling lighting, or a combination of the two, but such lighting schemes, although largely used, are objectionable in that the screen is noticeably lighted by the auditorium illumination and the eyes of the beholders are more or less disagreeably affected by those lighting units which are placed toward the screen end of the auditorium.

By the present invention ample lighting is provided for that part of the auditorium occupied by the audience, while the screen is in the shade and the lighting unit or units are so located as to be invisible to the audience as seated and gazing upon the screen. This is accomplished by providing lighting units with reflecting shields so arranged that beams of light are projected forwardly or screenward and also downwardly upon the audience from that portion of the auditorium distant from the screen, whereby the auditorium in that part occupied by the audience is sufficiently well lighted so that any one can see distinctly about the auditorium, but the ceiling and a portion of the side walls, and particularly the screen, are all in the shade. Such light as is projected toward the screen is projected against the backs of the people making up the audience and occupying the seats provided, wherefore the eyes of the audience are directed away from the source of light when looking upon the screen, and hence the audience is in no wise distracted by any lights in the line of vision except those upon the screen itself. The result is that the pictures upon the screen become sensibly intensified in brilliancy, while at the same time the audience portion of the auditorium is bathed in light which may be brilliant enough to permit reading, wherefore the light may be termed a reading light.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a perspective view in part schematic, illustrating the application of the invention to a motion picture auditorium. Fig. 2 is a schematic longitudinal section of a motion picture auditorium showing a variation in the lighting scheme of Fig. 1. Fig. 3 is a longitudinal section of a lighting unit adapted for the lighting of motion picture auditoriums. Fig. 4 is a top plan view thereof. Fig. 5 is a bottom plan view of the structure of Figs. 3 and 4. Fig. 6 is a section on the line 6—6 of Fig. 5. Fig. 7 is a side elevation with some parts in section showing an attachment to the structure of Fig. 3 and associated figures. Fig. 8 is a section on the line 8—8 of Fig. 7.

Referring first to Fig. 3 and associated figures, there is shown an elongated rectangle box 1 comprising a top member 2, side members 3, and end members 4, 5, respectively, while the part which would constitute the bottom of the box is omitted except that there is a short section 6 at the end 5 of the box and extending for a distance toward the end 4, but the remainder of what constitutes the bottom of the box is open. It will be understood that the expressions of position have to do with the manner in which the box is mounted when in use.

Extending from the center line of the inner face of the top 2 of the box toward the lower edges of the sides 3 are plane reflecting plates 7 diverging toward the open bottom of the box, and of substantially the length of the box, except that at the end 4 there is provided a concave reflecting surface 8 curving from the bottom portion of the end 4 of the box in an upward direction toward the top 2 of the box, so that the upper end of the curved surface 8 is closer to the end 5 of the box than the lower end of this reflecting surface.

Carried by the end 5 of the box is a socket 9 opening into the interior of the box and arranged to receive an electric lamp 10 which in most cases may be a forty watt or a sixty watt Mazda lamp, but the size and style of the lamp are not essential to the present invention. The short bottom length of the box is sufficiently long to coact with the top, sides and end 5 of the box to house the lamp 10, so that any one directly under the box 1 and looking upwardly would have the lamp hidden from view. To increase the extent of hiding from view of the lamp, a slide 11 is sometimes provided with the edges of this slide moving in side channels 12 of the short bottom portion of the box, so that the hiding portion may be elongated by pulling out the slide 11.

In order to support the box in the manner to be described, any suitable holder may be provided. In the particular showing of the drawings a rod 13 is secured to the top of the box by clips 14, so that this rod extends for a considerable distance beyond what may be termed the back end 5 of the box. The rear end of the rod 13 extends through a sleeve 15 in which it is held by a set screw 16. The sleeve may be rotated upon an axial holder 17 and clamped in any suitable position of adjustment by a set screw 18. The holder 17 is carried by a rod 19 which at the end remote from the holder 17 is lodged in a block 20, being made fast therein by a set screw 21. The block 20 is secured by a set screw 22 to a bracket 23 fast on a wall plate 24 which in turn may be secured in any suitable manner to a supporting wall. The supporting structures described permit the universal movement of the box 1 for its adjustment for a purpose which will hereinafter appear.

The reflecting surfaces 7 have plane bottom marginal portions or edges 25 parallel with the sides 3 of the box, and the curved reflector 8 has a lower marginal portion 26 parallel with the front 4 of the box, and these particular portions serve as cut offs for the light directed toward them from the lamp 10 and in a manner accentuate the shadow line cast by the box itself, this box being of opaque material and therefore acting as a shield for the lamp.

To prevent back reflections the box may be provided with an additional shield 27 considerably wider than the width of the box, and considerably shorter than the length of the box, the shield 27 being curved away from the back end 5 of the box toward the front end 4 thereof and dropping for a considerable distance below the open bottom of the box, wherefore when the lighting unit represented by the box 1 with its lamp and reflectors is placed in a position more or less in front of a portion of the audience when in the auditorium to be lighted, all those parts of the unit liable to direct light toward the eyes of the audience are shielded by the shield 27. This shield is an attachment for the light unit of Fig. 3 and associated figures, and is used only under certain conditions.

In Fig. 1 an auditorium 28 is more or less schematically indicated, such auditorium being intended for the exhibition of motion pictures. There is a screen 29 shown at one end of the auditorium, while the light emitting opening 30 of the operator's booth is also shown in Fig. 1. Near the ceiling of the auditorium and in most cases made fast to that wall through which the opening 30 is produced, are light unit boxes 1, it being found advisable to employ two such light units arranged on opposite sides of the opening 30 and placed quite close to the ceiling of the auditorium. The light emitted from the lamp 10 passes out from the box directly through the open bottom thereof and is also directed by the reflectors 7 and 8 in sidewise directions. The front 4 of the box with the lower margin 26 of the reflector 8 casts a shadow in the direction of the length of the box and toward the screen 29 and by properly adjusting the box 1 where one is used, or the boxes 1 where more than one is used, there is produced below the lower margin of the screen 29 a shadow line indicated at 31, and all of the screen end of the auditorium above the shadow line is in comparative darkness or shade, while the side walls of the auditorium are lighted to progressively higher extents from the shadow line 21 toward that end of the auditorium adjacent to the operator's booth. The top and sides of the box or boxes 1 cast shadows against the ceiling of the auditorium and portions of the side walls, while the front 4 of the box shades the screen. However, the reflectors 7 and 8, as well as direct rays of light from the lamp 10 light up the portion of the auditorium occupied by the seats for the audience. Actual tests have shown that this lighting is sufficient for ordinary reading, so that it may be termed reading lighting, but the screen is located in a marked shadow. The source of light, however, is back of most of the audience and the source of light is therefore far removed from the eyes of the audience, although the general illumination of the auditorium is such as to make the audience clearly visible, and this to an extent permitting the people entering the theater from a light street to find their way to seats without difficulty and without the temporary blindness so noticeable upon entering many motion picture theaters from a street in daylight or brilliantly lighted at night.

The comparatively dense shadow at the screen end of the auditorium serves to materially accentuate the pictures on the screen, so that the pictures become sensibly more brilliant. Moreover, the eyes of the audience do not become in any manner fatigued or distracted from the presence of the sources of light more or less in the line of vision even though these sources of light be in part shielded, for even with indirect lighting the ceiling of the auditorium is lighted up and that portion near the screen becomes visible to the audience, and especially those more remote from the screen.

With the present invention it is possible in elongated auditoriums to place one or more units 1 closer to the screen than in the arrangement shown in Fig. 1, this second arrangement being illustrated in Fig. 2, but the lighting units 1 are so arranged that their front portions 4 throw the screen into the shadow the same as in the arrangement of Fig. 1. The more forward lighting unit or units 1 of Fig. 2 might prove obtrusive to those of the audience near the back of the auditorium and in such case the shields 27 are applied, so that the light units even in the arrangement of Fig. 2 are not actually obtrusively visible to any person in the audience, but they serve to compensate for the great distance which the rearmost light units 1 are from the front or screen end of the auditorium when placed against the rear wall of the room. In many motion picture auditoriums the arrangement of Fig. 1 is found to be ample, but in some of the more elongated ones the arrangement of Fig. 2 is advisable.

While the box 1 has been described as of elongated rectangular shape, it will be understood that this box performs the office of a casing for protecting the light giving and reflecting elements, and hence its shape and construction are not particularly essential to the present invention and under some circumstances might even be omitted in part, especially when the reflectors are made of opaque material such as polished aluminum or nickle plated and polished copper or the like. While the reflectors direct the light rays from the light-giving element they also serve when made of opaque material as light shielding means. The box or casing 1 is however advantageous as a source of protection for the parts inclosed thereby, and for imparting rigidity and stability to the structure and providing a ready means for the attachment of the supporting and adjusting devices. Ordinarily the outer casing is made of sheet metal but may be made of other material, such as papier mâché, asbestos board, and the like.

The rear shade which may be employed as an attachment to the lighting unit when the latter is used in a more forward position, that is, nearer the screen than those light giving elements stationed close to the operator's booth, may be made of sheet metal or other suitable material either entirely impervious to light, or may be constructed so as to give an ornamental effect, in which case other materials than metal may be employed. The prime purpose of the additional shade is merely to shut off any light spots from the view of those persons in the audience sitting to the rear of the shaded light, so that even though the lighting unit be otherwise within their range of vision it presents no distracting view preventing the concentration of attention upon the picture production.

The lighting fixture or unit is so located in the auditorium as to leave nothing visible to the eye except that the audience is located in a well lighted portion and, of course, the picture as appearing on the screen is also lighted, but not by the auditorium lights. There are, therefore, no objects or vivid outlines apparent to the audience, wherefore because of the possibility of full unobstructed concentration the picture being exhibited upon the screen appears more real and life like than is the case with the lighting systems in use in practically all motion picture auditoriums.

With the present invention the cost of illuminating the auditorium is reduced because of the fewer lamps necessary and since the screen is subjected to far less foreign light than ordinary even in poorly lighted auditoriums when illuminated by the systems now in general use, the screen becomes better illuminated and more satisfactorily illuminated so far as the audience is concerned than heretofore, with respect to the sharp projected picture effect.

What is claimed is:—

1. A motion picture auditorium provided with a picture-exhibiting screen at one end, illuminating means for the auditorium in elevated position therein and distant from the screen, said illuminating means comprising a source of light, reflectors associated therewith, and light shielding means inclosing the source of light and the reflectors and open on the under side in the direction toward the screen end of the auditorium to cause the direct and reflected light rays from the source of light to be projected toward the floor and toward the screen end of the auditorium, with the screen and the ceiling of the auditorium in the shadow produced by the light shielding means.

2. A motion picture auditorium provided with a picture-exhibiting screen at one end, illuminating means for the auditorium in elevated position therein and distant from the screen, said illuminating means comprising a source of light, reflectors associated therewith, and light shielding means inclosing the source of light and the reflectors and open on the under side in the direction toward the screen end of the auditorium to cause the direct and reflected light rays from the source of light to be projected toward the floor and toward the screen end of the auditorium, with the screen and the ceiling of the auditorium in the shadow produced by the light shielding means, said illuminating means with the reflecting means being elongated in the direction of the length of the auditorium toward the screen end thereof with the source of light at the end of the illuminating means distant from the screen.

3. A motion picture auditorium provided with a screen at one end, and illuminating means therefor in elevated position in the auditorium and distant from the screen and comprising a plurality of elements located at the end of the auditorium remote from the screen and at points less remote from the screen, each element including a source of light, light reflecting means, and light shielding means in position one with relation to the other to project the light forwardly and downwardly toward the screen end of the auditorium with the screen and the ceiling of the auditorium in the shadow produced by the light shielding means, and the illuminating elements being situated in the auditorium to be out of the range of vision of an audience facing the screen.

4. A motion picture auditorium provided with a screen at one end, and illuminating means therefor in elevated position in the auditorium and distant from the screen and comprising a plurality of elements located at the end of the auditorium remote from the screen and at points less remote from the screen, each element including a source of light, light reflecting means, and light shielding means in position one with relation to the other to project the light forwardly and downwardly toward the screen end of the auditorium, with the screen and the ceiling of the auditorium in the shadow produced by the light shielding means, and the illuminating elements being situated in the auditorium to be out of the range of vision of an audience facing the screen, those illuminating elements nearer to the screen having shielding means of a size to be wholly interposed between the light emitting and reflecting means of said illuminating elements and the eyes of those members of the audience more distant from the screen than the said illuminating elements.

5. An illuminating element for a motion picture auditorium, comprising an elongated box of opaque material closed at the top, sides and ends and having a closed bottom extending for a fractional portion of the length of the box from one end thereof, a light giving means lodged in that portion of the box defined by the closed bottom part, divergent reflectors extending lengthwise of the box and having their reflecting surfaces directed toward the open portion of the bottom of the box, and means for supporting the box in position to light up the floor of the auditorium and to place the screen and ceiling of the auditorium in the shadow produced by the opaque top, sides and end of the box remote from the light giving means.

6. An illuminating element for a motion picture auditorium, comprising an elongated box of opaque material closed at the top, sides and ends and having a closed bottom extending for a fractional portion of the length of the box from one end thereof, a light giving means lodged in that portion of the box defined by the closed bottom part, divergent reflectors extending lengthwise of the box and having their reflecting surfaces directed toward the open portion of the bottom of the box, and means for supporting the box in position to light up the floor of the auditorium and to place the screen and ceiling of the auditorium in the shadow produced by the opaque top, sides and end of the box remote from the light giving means, said box having within it at the end distant from the light giving means a reflecting means curved from the bottom of the box upwardly and toward the other end of the box.

7. An illuminating means for motion picture auditoriums comprising an elongated box having a top, sides and ends of opaque material with the bottom closed for a fractional portion of its length and the remainder of the bottom open, said closed portion being provided with an opaque slide movable lengthwise of the box for increasing the effective length of the closed portion of the bottom of the box, light giving means in that end of the box defined by the closed bottom, and reflecting means in the box for projecting light out through the open portion of the bottom of the box in a direction lengthwise of the bottom of the box and away from the source of light.

8. An illuminating means for motion picture auditoriums comprising an elongated box having a top, sides and ends of opaque material with the bottom closed for a fractional portion of its length, and the remainder of the bottom open, said closed portion being provided with an opaque slide movable lengthwise of the box for increasing the effective length of the closed portion of the bottom of the box, light giving means in that end of the box defined by the closed bottom, and reflecting means in the box for projecting light out through the open portion of the bottom of the box in a direction lengthwise of the bottom of the box and away from the source of light, the reflecting means comprising plane reflectors extending lengthwise of the box and diverging from the center line of the top of the box toward the lower edges of the sides thereof, and a curved reflector within the box at the end thereof remote from the light source, said curved reflector being concaved and extending toward the lower edge of the corresponding end of the box and there terminating.

9. An illuminating means for motion picture auditoriums comprising an elongated box having a top, sides and ends of opaque material with the bottom closed for a fractional portion of its length, and the remainder of the bottom open, said closed portion being provided with an opaque slide movable lengthwise of the box for increasing the effective length of said closed portion of the bottom of the box, light giving means in that end of the box defined by the closed bottom, and reflecting means in the box for projecting light out through the open portion of the bottom of the box in a direction lengthwise of the bottom of the box and away from the source of light, the reflecting means comprising plane reflectors extending lengthwise of the box and diverging from the center line of the top of the box toward the lower edges of the sides thereof, and a curved reflector within the box at the end thereof remote from the light source, said curved reflector being concaved and extending toward the lower edge of the corresponding end of the box and there terminating, and said reflectors each having a plane portion along the lower edge parallel with the respective sides and end portion of the box.

10. An illuminating means for motion picture auditoriums comprising an elongated box of opaque material closed at the top, sides and ends, and along the bottom for a fractional portion of its length adjacent to one end, the box being provided with elongated interior reflectors along the sides diverging toward the open portion of the bottom of the box and with a concave reflector within the box at the end remote from that provided with an opaque bottom portion, light-giving means within the box at the end remote from the concave reflector, and a shield for that end of the box remote from the concave reflector and having a width and length to drop below the bottom of the box and extend beyond each side of the box.

11. An illuminating means for motion picture auditoriums comprising an elongated box of opaque material closed at the top, sides and end, and along the bottom for a fractional portion of its length adjacent to one end, the box being provided with elongated interior reflectors along the sides diverging toward the open portion of the bottom of the box and with a concave reflector within the box at the end remote from that provided with an opaque bottom portion, light giving means within the box at the end remote from the concave reflector, and a shield for that end of the box remote from the concave reflector and having a width and length to drop below the bottom of the box and extend beyond each side of the box, said box being provided with a support upon which the box may be tilted in different directions.

12. An illuminating means for motion picture auditoriums, comprising an elongated box with illuminating means housed in one end, and with the bottom portion of the box open from the housing portion of the box toward the other end, said box being provided with plane reflectors diverging from the longitudinal center line of the top of the box toward the lower edges, and a concave reflector in that end of the box remote from the illuminating means.

In testimony, that I claim the foregoing as my own, I have hereto affixed my signature in the presence of two witnesses.

FRANK G. McPHERSON.

Witnesses:
M. J. ROONEY,
EARL R. LEYDA.